(12) United States Patent
King, Jr. et al.

(10) Patent No.: US 7,377,286 B2
(45) Date of Patent: May 27, 2008

(54) DRAIN VALVE

(76) Inventors: Lloyd Herbert King, Jr., 394 Larimore Valley Dr., Chesterfield, MO (US) 63005; Michael Belgeri, 1007 Bridgeport, Ellisville, MO (US) 63011; James Keeven, 2641 Whitetail La., O'Fallon, MO (US) 63366

( * ) Notice: Subject to any disclaimer, the term of this patent is extended or adjusted under 35 U.S.C. 154(b) by 0 days.

(21) Appl. No.: 11/343,288

(22) Filed: Jan. 30, 2006

(65) Prior Publication Data
US 2006/0174940 A1     Aug. 10, 2006

Related U.S. Application Data

(60) Provisional application No. 60/651,722, filed on Feb. 10, 2005.

(51) Int. Cl.
*E03B 7/12*     (2006.01)

(52) U.S. Cl. .............................. 137/1; 137/62; 137/843; 137/517

(58) Field of Classification Search ................. 137/62, 137/843, 517, 519.5
See application file for complete search history.

(56) References Cited

U.S. PATENT DOCUMENTS

| | | | | | |
|---|---|---|---|---|---|
| 4,471,906 | A | * | 9/1984 | Noguchi et al. | 236/59 |
| 4,699,321 | A | * | 10/1987 | Bivens et al. | 239/204 |
| 4,821,954 | A | * | 4/1989 | Bowder | 236/48 R |
| 5,163,779 | A | * | 11/1992 | King, Sr. | 405/36 |
| 5,692,535 | A | * | 12/1997 | Walters | 137/62 |
| 6,102,127 | A | * | 8/2000 | Pierce | 169/37 |
| 6,427,712 | B1 | * | 8/2002 | Ashurst | 137/62 |
| 7,104,461 | B2 | * | 9/2006 | Restivo et al. | 236/93 R |

* cited by examiner

*Primary Examiner*—Kevin Lee
(74) *Attorney, Agent, or Firm*—Jacobson & Johnson

(57) ABSTRACT

A drain valve having a temperature responsive member that holds the drain valve in a water conserving mode when water is above freezing yet allows the drain valve to drain when the water is near freezing to prevent freeze damage to the irrigation system.

17 Claims, 2 Drawing Sheets

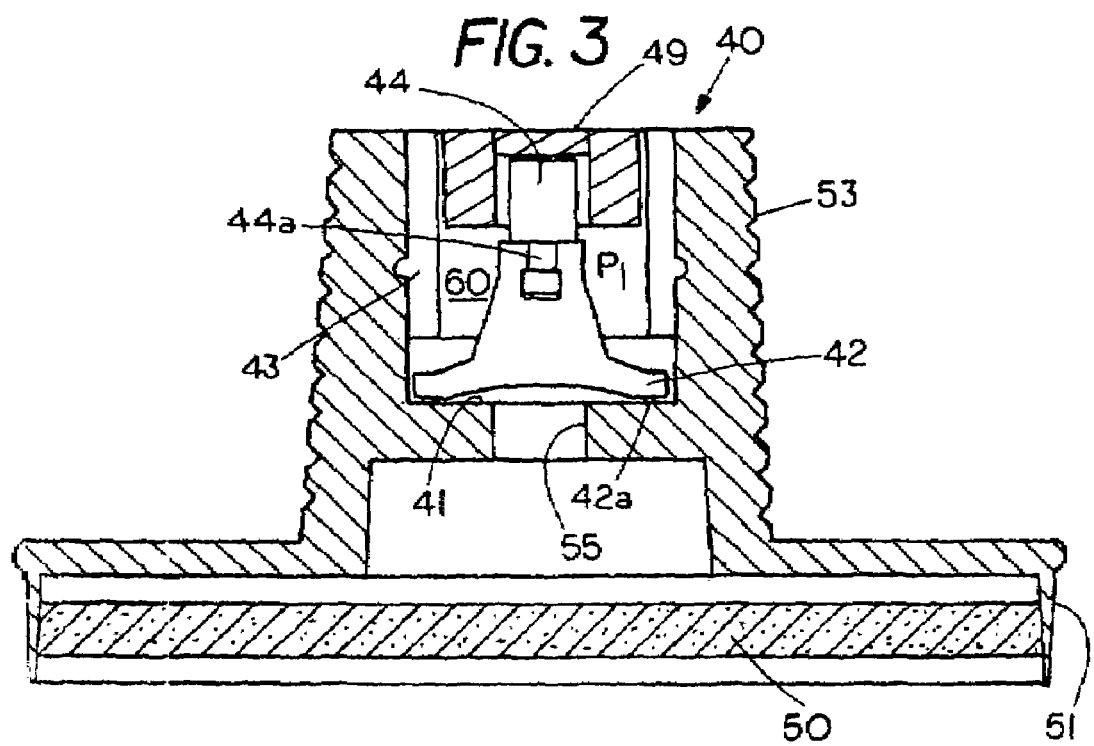
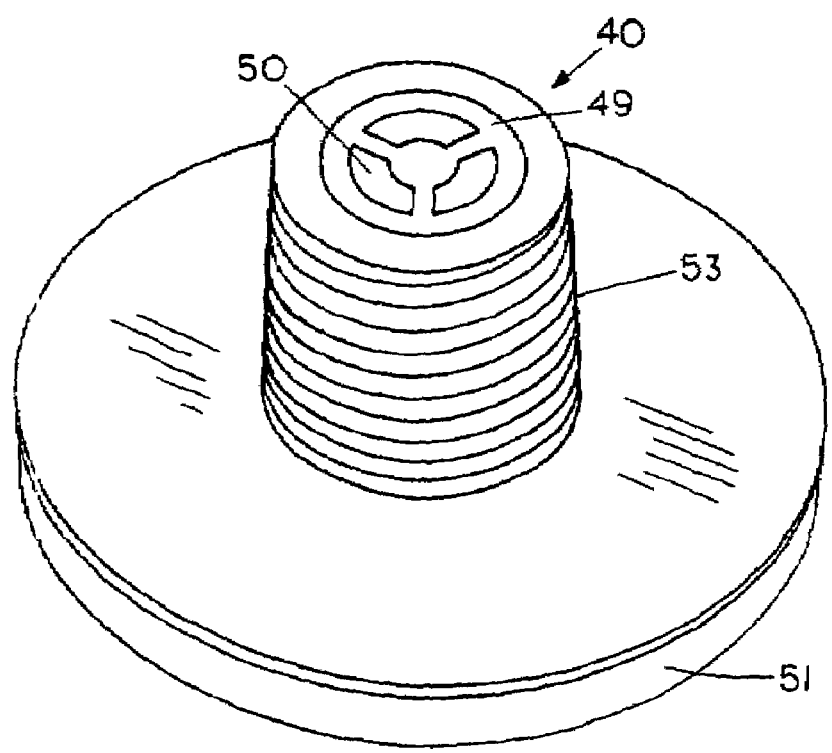

DRAIN VALVE

CROSS REFERENCE TO RELATED APPLICATIONS

This application claims priority from provisional application titled Temperature Controlled Drainage Valve Ser. No. 60/651,722 filed Feb. 10, 2005.

FIELD OF THE INVENTION

This invention relates generally to drain valves and, more specifically, to irrigation drain valves that are responsive to both pressure and temperature.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of irrigation drain valves is known in the art and typical of such drain valves are those shown in King U.S. Pat. Nos. 5,163,779; 5,080,527 and 4,890,640.

Typically, an irrigation system includes a set of spaced, above ground sprinkler heads and underground water supply lines that supply water to the sprinkler heads. In climates where the water can freeze, a set of drain valves are placed at the lowest points of the water supply lines to allow water remaining in the water supply lines to drain out of the water supply lines in order to prevent freeze damage to the water supply lines.

The drain valves, which are located underground and at the lowest points in an irrigation system generally contain an elastomer member, which is mounted over a drain port in the irrigation drain valve. Under a no or low water pressure condition the elastomer is spaced from the drain port thereby allowing water to drain through the drain port. However, as the water supply line pressure increases the pressure within the drain valve also increases which forces the elastomer member against the drain port thereby sealing the drain port and preventing water from draining from the drain valve. Sealing the drain port allows all the water to be directed to the water sprinkler heads. Correspondingly, when the water pressure decreases i.e. the water to the water supply lines is shut off; the resilient elastomer retracts thereby opening the drain ports to allow water in the lines to drain through the drain ports. Thus, an irrigation system with pressure sensitive drain valves automatically drains the water in the water supply lines once the water supply lines are shut off.

While such systems are well suited for colder climates where freezing water can damage the irrigation system the drain valves can allow a substantial amount of water to be wasted during an irrigation season since the drain valves direct the drain water underground and not necessarily to the areas needing irrigation. If some locations water is scarce and a need exists to wisely use the available water. The invention described herein allows water to drain from the drain valve when freezing conditions occur but prevents water from draining from the water supply lines when freezing conditions are not present thus conserving water.

Thus a feature of the invention is a water-saving drain valve having two operating modes, an above freezing mode wherein the drain valve normally remains closed regardless of whether the system water pressure is on or off in order to prevent loss of water from the system and a second near freezing mode wherein the drain valve functions as a conventional drain valve that closes in response to a high system water pressure and opens in response to a low system water pressure to thereby drain the irrigation system and prevent freeze damage.

BRIEF SUMMARY OF THE INVENTION

Briefly, the invention comprises a drain valve having a temperature responsive member that holds the drain valve in a water conserving mode when water is above freezing yet allows the drain valve to drain when the water is near freezing to prevent freeze damage to the irrigation system.

BRIEF DESCRIPTION OF THE DRAWINGS

FIG. 3 shows and alternate embodiment of FIG. 1 with a temperature-sensitive insert; and FIG. 4 shows the top view of the embodiment of FIG.

DESCRIPTION OF THE DRAWINGS

Figure 1:
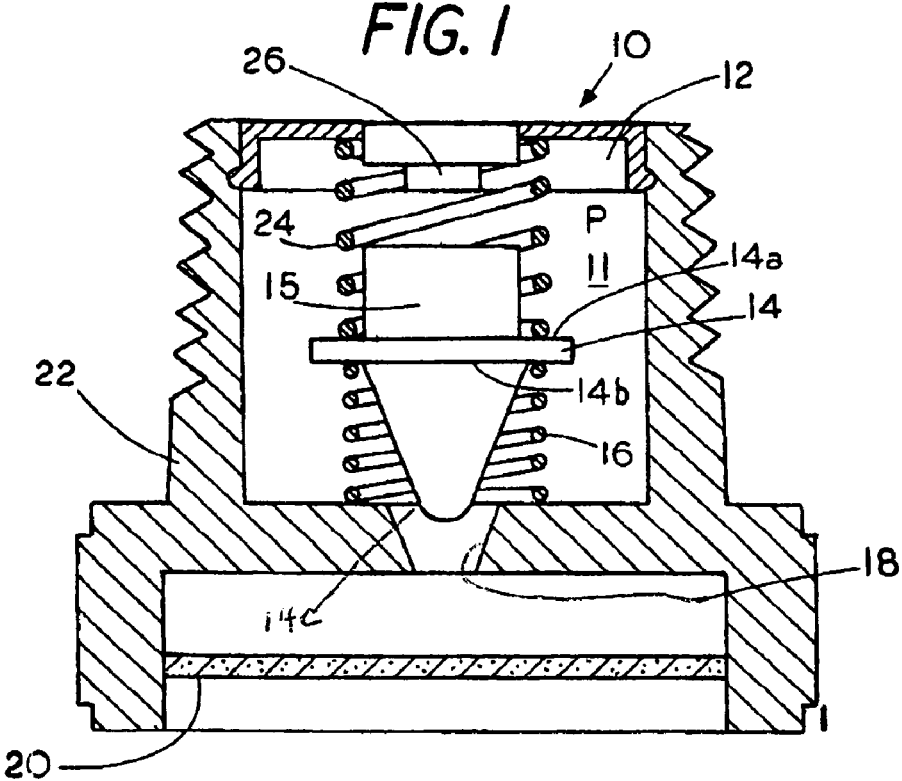
FIG. 1 is a sectional view of one embodiment of my invention in the drain mode.

FIG. 1 reference numeral 10 identifies an improved drain valve 10 that is in an open or drain mode when the temperature is near or below freezing but can automatically change to a closed water saving mode when the temperature is above freezing.

In the embodiment of FIG. 1 the drain valve 10 has a nonextrudable drain port-sealing member 15 axially displaceable in a housing 22. Housing 22 connects to underground water supply lines (not shown) to supply water for the irrigation system. The sizing of the sealing member 15 can be determined by numerous factors including the water pressure, the type of material used to make sealing member 15, and the size of the opening in the drain port 18.

Extending around drain port sealing member 15 is an annular lip 14 having an upper spring engaging surface 14a and a lower spring engaging surface 14b. More specifically, FIG. 1 shows sealing member 15 held in a spaced condition from drain port 18 as well as in vertical axial alignment with drain port 18 by the coaction of a temperature responsive bimetal spring 24 that exerts a downward force on upper surface 14a and a compression spring 16 that exerts an upward counterbalancing force on lower surface 14b. During start up of the irrigation system when the drain valve is in the drain mode condition, as shown in FIG. 1, high-pressure water enters chamber 11 through inlet 26 at sufficient flow rate to increase the pressure P in chamber 11. As pressure P increases the differential pressure forces across sealing member 14 force sealing member nose 14c into the drain port 18 thereby closing the drain port 18. That is, as the water supply line is activated to start the irrigation the pressure P in chamber 11 increases due to activation of the water supply lines overcoming the resistance of the compression spring 16 and forcing the sealing member 15 downward to the sealed condition shown in FIG. 2. In this condition water in the irrigation lines cannot drain out and the irrigation system can deliver water to the sprinkler heads.

Figure 2:
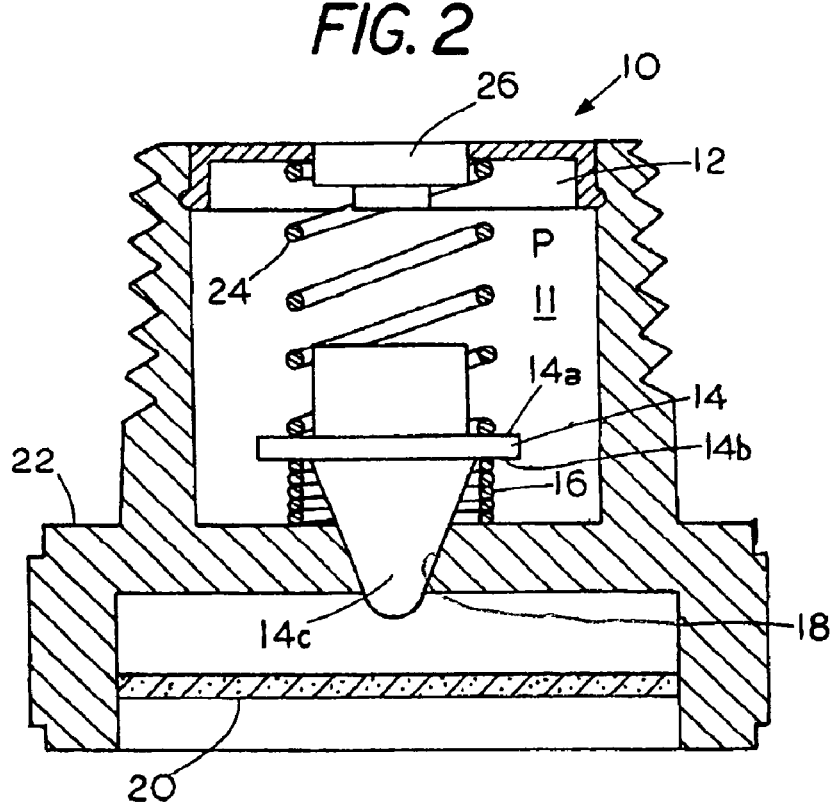
FIG. 2 is a sectional view of the invention in FIG. 1 in the non-drain mode.

FIG. 2 shows the drain valve 10 in the closed condition with the irrigation system not connected to a source of high pressure water. In the closed condition and in the absence of the high pressure water supply the force generated by the bimetal spring 24 is sufficient to overcome the counter force by the compression spring 16. That is, the bimetal spring is a temperature responsive member that elongates or extends when the temperature increases and contracts when the temperature decreases. Thus, if the water temperature is above freezing (the water conservation mode) the bimetal spring 24 holds the nose 14c in the drain port to prevent flow therethrough even if the irrigation system is shut off. However, if the temperature decreases the force generated by bimetal member 24 decreases allowing the compression spring to force the sealing member 14 into the open or drain condition shown in FIG. 1.

FIG. 3 and FIG. 4 show an alternate embodiment of a temperature responsive drain valve 40 that remains in an open or drain condition when the temperature is near or below freezing but remains in a closed water conserving mode when the temperature is above freezing.

Drain valve 40 includes a housing 53 having a base 51 with a drain pad 50 located therein. Located in drain valve 40 is a resilient member 42 that in the absence of pressure in the water lines is in the open condition shown in FIG. 3. When the water pressure in the drain valve 40 increases the sealing member 42 is forced downward to seal drain port 55 thus preventing water from draining out of the line. A drain valve with a resilient sealing member but without a temperature responsive member is shown and described in the King U.S. Pat. No. 4,890,640 and is herby incorporated by reference.

The embodiment of FIG. 3 and FIG. 4 differs from the King drain valve in that a temperature responsive member 44 is attached to the resilient sealing member 42. The temperature responsive member 44 includes an extendible member 44a that extends downward when the temperature is above freezing thus forcing the sealing member 42 to maintain the drain port 55 in a closed or water-conserving mode. However, when the water temperature is near or below freezing the member 44a is in a contracted condition as shown in FIG. 3 which allows the resilient member 42 to open and close in response to the pressure $P_1$ in chamber 60.

While the temperature responsive member is shown as a mechanical member having a bimetal spring or an extendible and contractible member the temperature responsive member 30 can, if desired, be operated by chemical reactivity or wireless activation utilizing battery or solar power.

Thus the invention includes a drain valve having a drain mode and a water conserving mode comprising a housing having a drain port therein with a pressure responsive sealing member located in the housing and the sealing member positioned proximate the drain port so that when the drain valve is in the drain mode the pressure responsive sealing member can seal the drain port when the water pressure increases and can open the drain port when the water pressure decreases and a temperature responsive member for holding the drain valve in a closed or water saving mode when the temperature is above freezing.

Thus a feature of the invention is that the temperature responsive member is ineffective to hold the drain valve in the closed or water saving mode when the temperature is near or below freezing.

We claim:

1. An underground irrigation drain valve having a drain mode and a water conserving mode comprising:
    a housing having a drain port therein;
    a pressure responsive sealing member sensitive to water pressure changes located in said housing, said sealing member positioned upstream of said drain port so that when the drain valve is in the drain mode the pressure responsive sealing member can seal the drain port when the water pressure increases and can open the drain port when the water pressure decreases; and
    a temperature responsive member for holding the drain valve in a closed or water saving mode when the temperature is above freezing, said temperature responsive member is ineffective to hold the drain valve in the closed or water saving mode when the temperature is near or below freezing.

2. The underground irrigation drain valve of claim 1 wherein the temperature responsive member comprises a bimetal spring.

3. The underground irrigation drain valve of claim 2 wherein the pressure response member is held in an open condition by a compression spring.

4. The underground irrigation drain valve of claim 1 wherein the sealing member is an elastomer.

5. The underground irrigation drain valve of claim 1 wherein the temperature responsive member includes an extendible member that extends as the temperature increases and contracts as the temperature decreases.

6. An underground irrigation drain valve having a drain mode and a water conserving mode comprising:
    a housing having a drain port therein;
    a pressure responsive sealing member located in said housing, said sealing member positioned proximate said drain port so that when the drain valve is in the drain mode the pressure responsive sealing member can seal the drain port when the water pressure increases and can open the drain port when the water pressure decreases, said pressure response member is held in an open condition by a compression spring, said pressure responsive sealing member includes an annular lip having a first surface for engaging the bimetal spring and a second surface for engaging the compression spring; and
    a temperature responsive member comprising a bimetal spring for holding the drain valve in a closed or water saving mode when the temperature is above freezing, said temperature responsive member is ineffective to hold the drain valve in the closed or water saving mode when the temperature is near or below freezing.

7. The underground irrigation drain valve of claim 6 wherein a force generated by the bimetal spring and a force generated by the compression spring are opposing each other.

8. The underground irrigation drain valve of claim 7 wherein the force of the bimetal spring at temperatures above freezing is sufficient to overcome the force of the compression spring to hold the sealing member in the closed or water conserving mode.

9. The underground irrigation drain valve of claim 8 wherein the force of the bimetal spring at temperatures near or below freezing is insufficient to overcome the force of the compression spring to allow the compression spring to maintain the drain port in an open condition when the irrigation system is shut off.

10. An underground irrigation drain valve having a drain mode and a water conserving mode comprising:
    a housing having a drain port therein;
    a pressure responsive sealing member sensitive to pressure changes, said member positioned upstream of said drain port so that when the drain valve is in the drain mode the pressure responsive sealing member can seal the drain port when the water pressure increases and can open the drain port when the water pressure decreases; and a temperature responsive member for overriding the pressure responsive sealing member to hold said sealing member in a closed or water saving mode when the temperature is above freezing, said temperature responsive member is ineffective to hold the drain valve in the closed or water saving mode when the temperature is near or below freezing.

11. An underground irrigation drain valve having a drain mode and a water conserving mode comprising:

a housing having a drain port therein;

a pressure responsive sealing member positioned proximate said drain port so that when the drain valve is in the drain mode the pressure responsive sealing member can seal the drain port when the water pressure increases and can open the drain port when the water pressure decreases; and a temperature responsive member for overriding the pressure responsive sealing member to hold said sealing member in a closed or water saving mode when the temperature is above freezing, said temperature responsive member is ineffective to hold the drain valve in the closed or water saving mode when the temperature is near or below freezing, said temperature responsive member includes a temperature sensor that is remote from the drain valve.

12. An underground irrigation drain valve having a drain mode and a water conserving mode comprising:

a housing having a drain port therein;

a pressure responsive sealing member positioned proximate said drain port so that when the drain valve is in the drain mode the pressure responsive sealing member can seal the drain port when the water pressure increases and can open the drain port when the water pressure decreases; and a temperature responsive member for overriding the pressure responsive sealing member to hold said sealing member in a closed or water saving mode when the temperature is above freezing, said temperature responsive member is ineffective to hold the drain valve in the closed or water saving mode when the temperature is near or below freezing, said temperature responsive member having an extendible member to hold the sealing member over the drain port.

13. A method of water conservation while preventing freeze damage in an irrigation system comprising:

sensing when water pressure changes to open a drain port when the water pressure is off and the temperature is near or below freezing to drain the irrigation system; and closing the drain port by exerting a closing force on a drain port sealing member with a bimetal spring when the temperature is above freezing to prevent water from draining from the irrigation system.

14. The method of claim 13 including the step of exerting an opening force on a drain port sealing member.

15. The method of claim 13 wherein the step of exerting a closing force on a drain port sealing member overrides an opening force on the drain port sealing member.

16. The method of claim 13 including the step of using a compression spring to counterbalance a force from a temperature responsive member.

17. The method of claim 13 wherein the method of water conservation includes deforming an elastomer over the drain port.

* * * * *